US008615210B2

(12) United States Patent
Mantravadi et al.

(10) Patent No.: US 8,615,210 B2
(45) Date of Patent: Dec. 24, 2013

(54) METHODS AND APPARATUS FOR POWER MEASUREMENT IN A COMMUNICATION SYSTEM

(75) Inventors: Ashok Mantravadi, San Diego, CA (US); Phani Bhushan Avadhanam, San Diego, CA (US); Vinay Murthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 11/624,644

(22) Filed: Jan. 18, 2007

(65) Prior Publication Data

US 2008/0085685 A1 Apr. 10, 2008

Related U.S. Application Data (60) Provisional application No. 60/828,607, filed on Oct. 6, 2006.

(51) Int. Cl.
*H04B 17/00* (2006.01)

(52) U.S. Cl.
USPC ........... 455/226.1; 455/226.2; 455/226.3; 455/67.11; 455/67.13; 455/67.14; 455/70; 375/224; 375/317; 375/213; 375/345; 375/350; 375/227; 375/228; 324/523; 324/603; 324/604; 324/605; 324/606

(58) Field of Classification Search
USPC ......... 375/224, 261, 344, 345, 346, 350, 227, 375/228, 317, 213; 455/67.11–67.7, 455/115.1–115.4, 226.1–226.4, 70; 324/523, 603, 604, 605, 606
See application file for complete search history.

(56) References Cited

U.S. PATENT DOCUMENTS

| 5,621,767 | A   | * | 4/1997  | Brandt et al. | 375/344 |
| 2002/0191685 | A1 | * | 12/2002 | Sadowski | 375/224 |
| 2003/0123561 | A1 | * | 7/2003  | Menkhoff et al. | 375/261 |
| 2004/0242180 | A1 | * | 12/2004 | Beach et al. | 455/323 |
| 2005/0260962 | A1 |   | 11/2005 | Nazrul et al. |  |
| 2006/0267812 | A1 | * | 11/2006 | Bunin | 341/120 |

(Continued)

FOREIGN PATENT DOCUMENTS

| CN | 1622497 A | 6/2005 |
| DE | 10157864 | 6/2003 |
| EP | 0722226 | 7/1996 |
| EP | 1536655 A2 | 6/2005 |

OTHER PUBLICATIONS

International Search Report—PCT/US07/080338, International Search Authority—European Patent Office—Dec. 14, 2007.

(Continued)

*Primary Examiner* — Junpeng Chen
(74) *Attorney, Agent, or Firm* — Fulbright & Jaworski LLP (57) ABSTRACT

Methods and apparatus for power measurement in a communication system. In an aspect, a method is provided for power measurement. The method includes selecting between a signal decoding mode and a power measurement mode, decoding an input signal if the signal decoding mode is selected, and calculating a power measurement associated with the input signal if the power measurement mode is selected. In another aspect, an apparatus is provided for power measurement. The apparatus includes means for selecting between an active mode and a power measurement mode, means for decoding an input signal if the active mode is selected, and means for calculating a power measurement associated with the input signal if the power measurement mode is selected.

65 Claims, 4 Drawing Sheets

(56) References Cited

U.S. PATENT DOCUMENTS

2007/0010224 A1* 1/2007 Shi ............................ 455/241.1
2007/0042743 A1* 2/2007 Ali et al. ...................... 455/313
2007/0042744 A1* 2/2007 Ali et al. ...................... 455/323
2007/0129038 A1* 6/2007 Ragan et al. ............... 455/226.4

OTHER PUBLICATIONS

Written Opinion—PCT/US07/080338, International Searching Authority—European Patent Office, Dec. 14, 2007.

* cited by examiner

METHODS AND APPARATUS FOR POWER MEASUREMENT IN A COMMUNICATION SYSTEM

CLAIM OF PRIORITY UNDER 35 U.S.C. §119

The present Application for patent claims priority to Provisional Application No. 60/828,607 entitled "POWER MEASUREMENT" filed Oct. 6, 2006, and assigned to the assignee hereof and hereby expressly incorporated by reference herein.

BACKGROUND

1. Field

The present application relates generally to the operation of communication systems, and more particularly, to methods and apparatus for power measurement in a communication system.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to be delivered over a distribution network as a transmit waveform.

The performance of a communication system may depend on the performance of the communication channel between the network and a device. To characterize this performance, it is desirable to measure the power at a receiving device. For example, measuring the power received by a device over a selected frequency band may be used to facilitate field testing or other functions related to the operation or improved performance of the device or communication system. Unfortunately, conventional devices operate to acquire network signaling before being able to perform any type of power measurement. However, it would be useful for a device to be able to perform power measurements without first acquiring network signaling. This would allow a device to perform power measurements without being required to register with a network or to meet other network pre-conditions. For example, it would be useful for a device to be able to identify external interference in the field and/or noise and interference from within the device when the network is turned off.

Therefore, it would be desirable to have a system that operates to allow a device that operates to communicate over a network to perform power measurements without having to acquire any network signaling structure.

SUMMARY

In one or more aspects, a power measurement system is provided that operates to measure power in a communication system. In an aspect, the system provides mode selection which allows operation in either an active mode or a power measurement mode. In the active mode, the system operates to allow a device to acquire a network signaling structure to facilitate the device's operation on the network. In the power measurement mode, the power of received signals is measured without regard to any network signaling structure. Thus, the measured power comprises signal, noise, and interference power. The system then operations to display, store, and/or transmit the measured power to any other entity as necessary.

In an aspect, a method is provided for power measurement. The method comprises selecting between a signal decoding mode and a power measurement mode, decoding an input signal if the signal decoding mode is selected, and calculating a power measurement associated with the input signal if the power measurement mode is selected.

In another aspect, an apparatus is provided for power measurement. The apparatus comprises control logic configured to select between an active mode and a power measurement mode, a decoder configured to decode an input signal if the active mode is selected, and power measurement logic configured to calculate a power measurement associated with the input signal if the power measurement mode is selected.

In another aspect, an apparatus is provided for power measurement. The apparatus comprises means for selecting between an active mode and a power measurement mode, means for decoding an input signal if the active mode is selected, and means for calculating a power measurement associated with the input signal if the power measurement mode is selected.

In another aspect, a computer-readable medium is provided that has a computer program comprising program instructions, which when executed, operate to provide for power measurement. The computer program comprises instructions for selecting between an active mode and a power measurement mode, instructions for decoding an input signal if the active mode is selected, and instructions for calculating a power measurement associated with the input signal if the power measurement mode is selected.

In still another aspect, at least one processor is provided that is configured to perform a method for power measurement. The method comprises selecting between an active mode and a power measurement mode, decoding an input signal if the active mode is selected, and calculating a power measurement associated with the input signal if the power measurement mode is selected.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

In one or more aspects, a power measurement system is provided that operates to measure power in a communication system. For the purpose of this description, aspects of the power measurement system are described herein with reference to a communication network that utilizes OFDM to provide communications between a network server and one or more mobile devices. However, it should be noted that the power measurement system is suitable for use with virtually any communication system.

Figure 1:
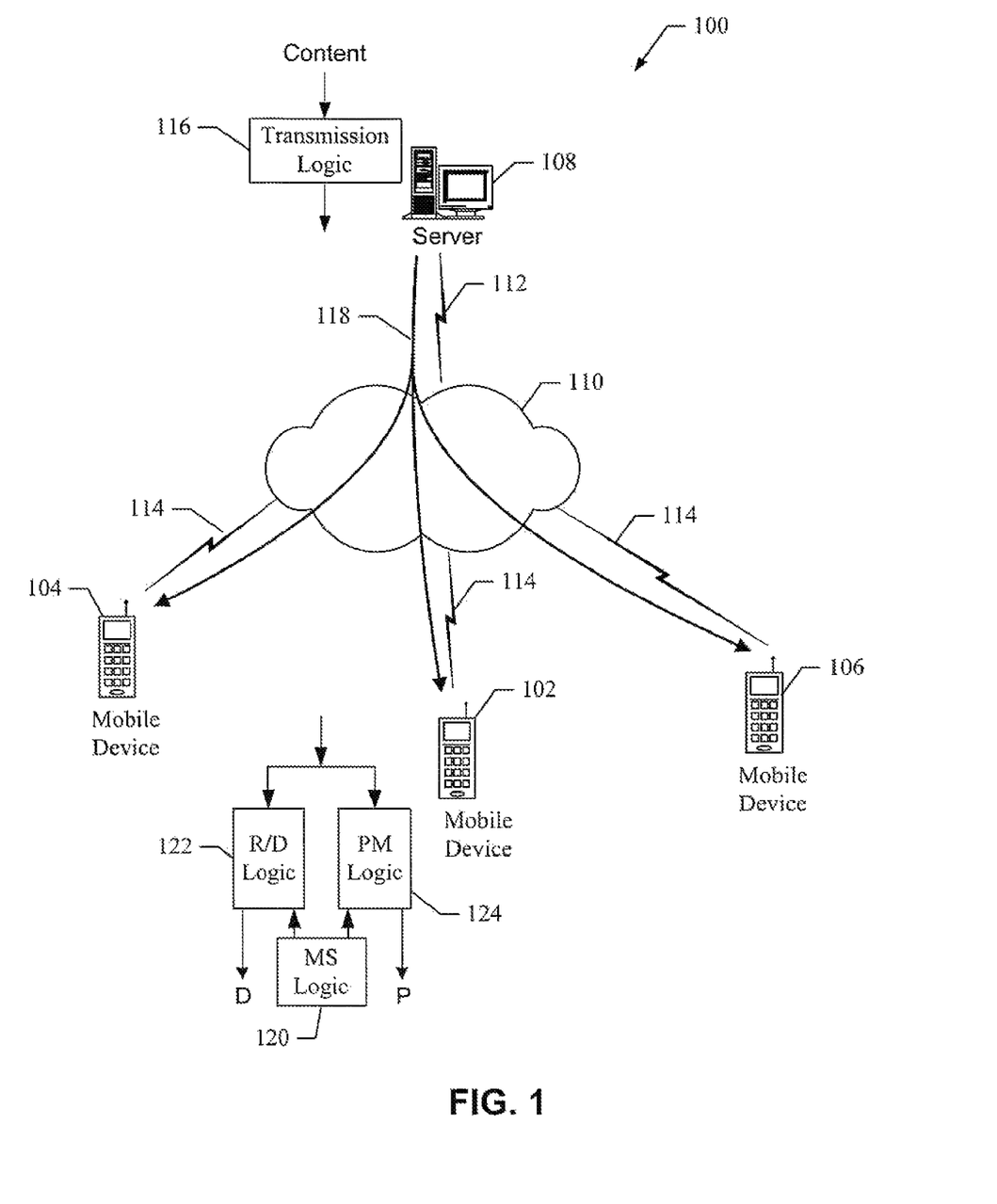
FIG. 1 shows a network that comprises an aspect of a power measurement system.

FIG. 1 shows a network 100 that comprises an aspect of a power measurement system. The network 100 comprises mobile devices 102, 104, 106, a server 108, and a communication network 110. For the purpose of this description, it will be assumed that the network 110 operates to provide communications with and one or more of the mobile devices using OFDM technology; however, aspects of the power measurement system are suitable for use with other transmission technologies as well.

In an aspect, the server 108 operates to provide services that may be subscribed to by devices in communication with the network 110. The server 108 is coupled to the network 110 through the communication link 112 that comprises any suitable communication link. The network 110 comprises any combination of wired and/or wireless networks that allows services to be delivered from the server 108 to devices in communication with the network 110, such as the device 102.

The devices 102, 104, and 106 in this aspect comprise mobile telephones that communicate with the network 110 through the wireless links 114. The wireless links 114 comprises wireless communication links based on OFDM technology; however, in other aspects the wireless links 114 may comprise other suitable wireless technologies that operate to allow devices to communicate with the network 110. For the remainder of this description, aspects of the power measurement system are described with reference to the device 102; however, the aspects are equally applicable to the devices 104 and 106.

It should be noted that the network 110 may communicate with any number and/or types of devices within the scope of the aspects. For example, other devices suitable for use in aspects of the power measurement system include, but are not limited to, a personal digital assistant (PDA), email device, pager, a notebook computer, mp3 player, video player, or a desktop computer.

The server 108 comprises content that includes real time and non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to transmission logic 116, which processes the content to produce a transmission frame. The transmission logic 116 operates to transmit the transmission frame over the network 106 as a transmit waveform 118. For example, the transmission frame may be distributed over the network 110 using a broadcast channel.

The device 102 comprises mode selection (MS) logic 120 that operates to select between first and second operating modes. The first operating mode is an active mode that allows the device 102 to decode a received signal using a network signaling structure to obtain transmitted data. The second operating mode is a power measurement mode that operates to measure the power received at the device 102 without regard to any signaling structure. In an aspect, user input is processed by the MS logic 120 to determine the selected mode.

In the first operating mode, the MS logic 120 activates receiver/demodulator (R/D) 122 to receive and demodulate the transmit waveform 118 to obtain the transmitted data (D).

The MS logic 120 selects the second operating mode (power measurement mode) so that the device operates to perform a power measurement. For example, in the second operating mode, the MS logic 120 operates to activate power measurement (PM) logic 124 to measure received power. It should be noted that the PM logic 124 performs a power measurement based on measuring signal energy in the time domain and does not use any specific properties of the received transmit waveform. Thus, the PM logic 124 measures the power of a received signal without regard to whether the signal comprises signal, noise, and/or interference energy.

Therefore, aspects of a power measurement system operate to measure power in a communication network by performing one or more of the following functions.

a. Select an operating mode (i.e., active or power measurement mode).
b. Process a received waveform to recover transmitted data if the active operating mode is selected.
c. Select a frequency range and measure received power if the power measurement operating mode is selected.
d. Store, display, and/or transmit the power measurement.

Aspects of a power measurement system operate to allow a multimedia device to efficiently measure power. It should be noted that the power measurement system is not limited to the implementations described with reference to FIG. 1, and that other implementations are possible.

Figure 2:
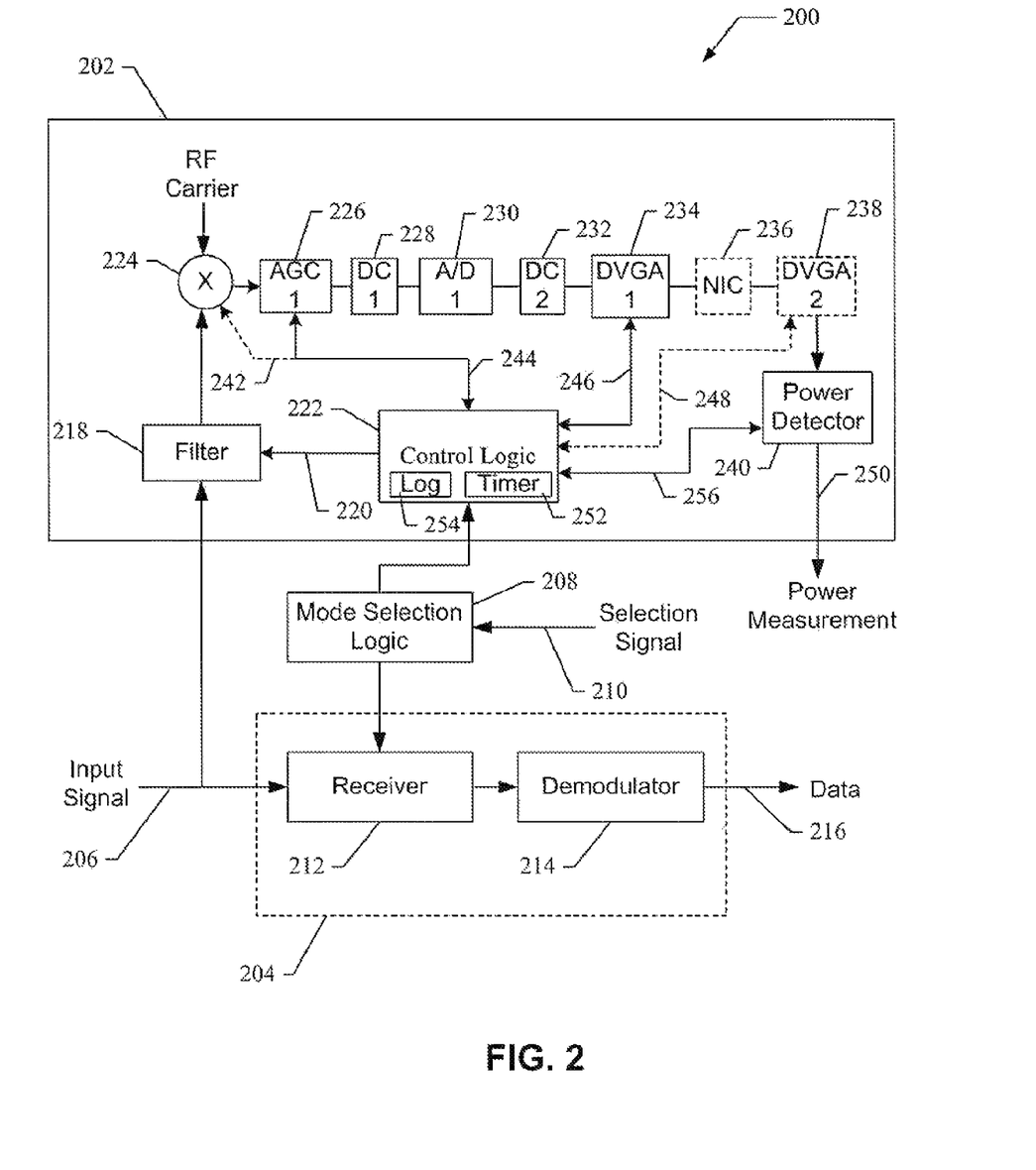
FIG. 2 shows an aspect of a power measurement system.

FIG. 2 shows an aspect of a power measurement system 200. The power measurement system 200 comprises power measurement logic 202, receiver/demodulator logic 204, and MS logic 208. For example, the power measurement system 200 is suitable for use with the device 102 shown in FIG. 1.

It should be noted that the power measurement system 200 is just one implementation and that other implementations are possible. For example, in the system 200, an input signal 206 is fed in parallel to the receiver/demodulator 204 and the power measurement logic 202. However, in another aspect, the input signal 206 is fed to the power measurement logic 202 and its output is fed to the receiver/demodulator 204. Thus, various implementations are possible within the scope of the aspects.

The MS logic 208 operates to select between two modes of operation. The first mode of operation is an active mode and the second mode of operation is a power measurement mode. In an aspect, the MS logic 208 operates to receive a selection signal 210 that is used to determine the mode of operation to be selected. For example, the selection signal 210 may be derived from a user input, or from the operation of hardware and/or software associated with the device 102.

In an aspect, if the active mode is selected, the receiver 212 is activated by the MS logic 208 to process the input signal 206 based on a network signaling structure. For example, the input signal 206 comprises a transmission frame carrying transmitted content or services from a distribution server, and the receiver 212 operates to allow a device to search the input signal 206 for a preamble at the start of the transmission frame. The receiver 212 converts the input signal 206 to base band and outputs the base band signal to a demodulator 214. The demodulator 214 operates to demodulate the base band signal to obtain the transmitted data 216.

In an aspect, if the power measurement mode is selected, the control logic 222 is activated by the MS logic 208. The control logic 222 operates to communicate with other functional elements of the power measurement logic 202 to facilitate power measurement.

During power measurement mode, the control logic 222 provides a filter control signal 220. A filter 218 receives the filter control signal 220 and operates to filter the input signal 206 based on a selected frequency band. For example, in an aspect, the filter 218 is a surface acoustic wave (SAW) filter whose center frequency is selected by the filter control signal 220. A filtered signal is output from the filter 218 and is input to a down converter 224 that down converts the filtered signal based on an RF carrier signal. A resulting base band signal is input to first automatic gain control (AGC) logic 226. The first AGC 226 operates to control the gain of the base band signal based on a first AGC scaling signal received from the control logic 222 through the link 244. In an aspect, a scaling signal is also applied to the down converter 224, as shown at 242, and used during the down-conversion operation.

The output of the first AGC 226 is input to first DC offset logic 228. The first DC offset logic 228 comprises any suitable logic operable to remove a DC offset from the output of the first AGC 226 to produce a first DC adjusted signal that is input to a first analog to digital (A/D) converter 230.

The first A/D 230 comprises any suitable logic operable to digitize the signal at its input to produce a first digital output signal that is input to second DC offset logic 232. The second DC offset logic 232 comprises any suitable logic operable to remove a DC offset from the output of the first A/D 230 to produce a second DC adjusted signal that is input to a first digital variable gain amplifier (DVGA) 234.

The first DVGA 234 comprises second AGC logic and second A/D logic. The first DVGA 234 receives a second scaling signal from the control logic 222 through the link 246 and performs gain control using this second scaling signal. The first DVGA 234 also includes a first loop accumulator (Acc1) that operates to accumulate error values associated with the gain control process. The first loop accumulator Acc1 is output from the DVGA 234 to the control logic 222 using the link 246.

In an aspect, the output of the first DVGA 234 is input to a power detector 240 where power measurement is performed. In another aspect, an optional narrowband canceller 236 and second DVGA 238 are utilized. For example, the output of the first DVGA 234 is input to the narrowband interference cancellation (NIC) logic 236 that comprises any suitable logic operable to cancel narrowband interference from its input signal. The output of the NIC logic 236 is input to the second DVGA 238. The second DVGA 238 comprises third AGC logic and third A/D logic. The second DVGA 236 receives a third scaling signal from the control logic 222 through the link 248 and performs gain control using this third scaling signal. The second DVGA 234 also includes a second loop accumulator (Acc2) that operates to accumulate error values associated with the gain control process. The second loop accumulator Acc2 is output from the DVGA 238 to the control logic 222 using the link 248.

The power detector 240 comprises any suitable logic and operates to measure the power of the signal it receives and output a power measurement 250. In an aspect, the power detector 240 operates to detect power according to the algorithm provided below. In an aspect, the power measurement 250 is stored, displayed, and/or transmitted to a third party as necessary.

The power measurement system 200 comprises a CPU, processor, gate array, hardware logic, virtual machine, software, and/or any combination of hardware and software. For example, in an aspect, the power measurement system 200 may be implemented completely in hardware through the use of analog and/or digital circuitry. In another aspect, the power measurement system 200 may be implemented using a combination of hardware and software through the use of programmable gate arrays, memories, and/or other programmable logic. In another aspect, the power measurement system 200 may be implemented completely in software as a computer program comprising instructions that are executed by at least one processor.

In an aspect, the power measurement system comprises a computer program having one or more program instructions ("instructions") stored on a computer-readable medium, which when executed by at least one processor, provides the functions of the power measurement system 200 described herein. For example, instructions may be loaded into the power measurement system 200 from a computer-readable media, such as a floppy disk, CDROM, memory card, FLASH memory device, RAM, ROM, or any other type of memory device. In another aspect, the instructions may be downloaded into the power measurement system 200 from an external device or network resource. The instructions, when executed by the power measurement system 200 operate to provide aspects of a power measurement system as described herein.

Thus, the power measurement system 200 operates to select between first and second operating modes and provide signal decoding or power measurements as necessary. The determined power measurements are relative to a selected frequency range and are not based on any signaling structure. It should be noted that the power measurement system 200 is just one implementation and the other implementations are possible within the scope of the aspects.

Power Measurement Operation

In an aspect, power measurement is performed by configuring a multimedia device for operation in power measurement mode. When in power measurement mode, the multimedia device acts like a power meter. In an aspect, the power measurement mode is initiated through a diagnostic command issued by a device user. In another aspect, the diagnostic command to initiate the power measurement mode is issued by software. It would be apparent to one of ordinary skill in the art that the diagnostic command can also be implemented by hardware or a combination of hardware and software. Once the power measurement mode is activated, one or more of the following functions are performed. For example, the power measurement system 200 is configured to perform the following functions when the power measurement mode is selected.

1. Configure RF Front-End

In an aspect, the RF front-end of a device is configured so that the power measurement occurs in a desired frequency band. The configuration involves choosing the appropriate SAW filter parameters. For example, the control logic 222 selects parameters of the SAW filter 218. The SAW filter 218 operates at RF and is intended to suppress adjacent channel energy. Because of the presence of the SAW filter, the power can be measured reliably in the band for which the SAW is designed and the adjacent bands on either side. Specifically, if the SAW filter is designed for channel 53 (i.e., 707 Mhz), power can be measured in channels 52, 53 and 54. The receiver bandwidth can also be chosen (e.g. 6 Mhz or 8 Mhz) to measure the power in the bandwidth of interest.

2. Remove DC Offset

DC offset removal is provided so that any residual DC component in the base band signal is removed. A DC component can appear due to self-mixing or bias in the A/D converters and cause an erroneous increase in the measured power. For example, the DC offset logic 228 and 232 operate to remove any DC component to produce DC adjusted signals. Removing any DC component facilitates looking for weak interference in the field.

3. AGC Acquisition

To prevent receiver A/D saturation, AGC acquisition is provided. Each AGC comprises a selected number of analog gain steps and a digital gain applied after the A/D. The gain steps and digital gain are chosen so that the energy of the digital samples is at a constant value. For example, the DVGA 234 provides this function.

4. Start Periodic Timer

To save on battery life, a periodic timer is started that expires every "T" ms. The period T is configurable and determines the frequency of the power measurements. In an aspect, hardware logic is turned off during the time that the power measurements are not being performed to save power. An alternative mechanism utilizes hardware/software to generate periodic interrupts that cause the device software to measure power in the corresponding interrupt service routine. In an aspect, the timer 252 is used to measure the periodic interval used to determine when power measurements are to be made. For example, the expiration of the timer 252 causes the control logic 222 to activate the power measurement function.

5. Store Error Register Values

For each expiration of the timer 244, error registers associated with the operation of the gain control functions at the DVGA 234 and DVGA 238 are read, and the obtained values are stored in a log packet. For example, the DVGA 234, and DVGA 238 comprise error registers (i.e., Acc1 and Acc2, respectively) that contains AGC loop accumulator values. The Acc1 and Acc2 values are obtained by the control logic through the links 246 and 248, respectively and stored in the log 254.

6. Calculate RSSI

In an aspect, the power detector 240 operates to calculate a received signal strength indicator (RSSI) that indicates the energy received by a device. In an aspect, the power detector 240 receives the Acc1 and Acc2 values from the control logic 222 through the link 256 and uses these values to calculate the RSSI according to the following. In an aspect, when the NIC 236 and DVGA 238 are not used, the RSSI is calculated as follows;

$$RSSI=3.01*[8192-Acc1(n)]/1024+ DVGA1SetPtTable[AGCGainState] \text{ (dBm)}$$

where $Acc1(n)$ is the loop accumulator value at the instant of measurement and the DVGA1SetptTable[ ] is obtained through factory calibration.

In another aspect, when the NIC 236 and DVGA 238 are included, the power detector 240 operates to calculate the RSSI according to the following.

$$RSSI=3.01*[8192-Acc1(n)-Acc2(n)]/1024+ DVGA1SetPtTable[AGCGainState] \text{ (dBm)}$$

Note that the measured power includes the power of any transmitted signal and/or any other signal present in the band. In an aspect, no specific property of a transmit signal is used to measure power beyond the center frequency and the bandwidth.

In an aspect, a device can remain in the power measurement mode for an indefinitely long period. Another command code can be issued to disable power measurement mode and return the device to the active mode, or the device can be reset.

Figure 3:
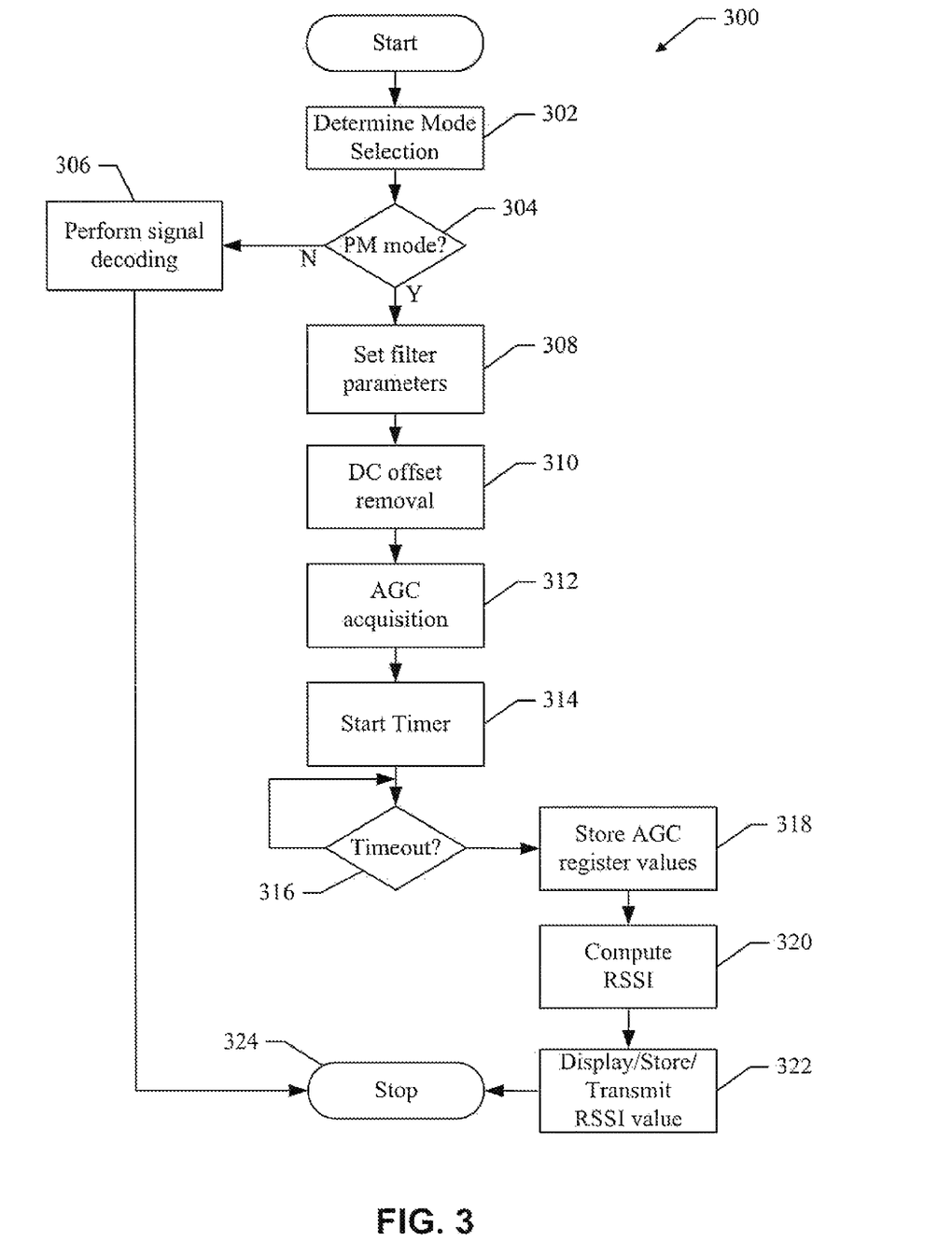
FIG. 3 shows a method for providing a power measurement system.

FIG. 3 shows an aspect of a method 300 for providing a power measurement system. For example, in an aspect, the power measurement system 200 is configured to perform the method 300 as describe below.

At block 302, a mode selection is determined. In an aspect, the mode selection logic 208 operates to determine the mode selection based on the selection signal 210. The mode selection is a selection between an active mode and a power measurement mode.

At block 304, a test is performed to determine if the power measurement mode has been selected. In an aspect, the mode selection logic 208 operates to make this determination. If the power measurement mode has not been selected the method proceeds to block 306. If the power measurement mode has been selected, the method proceeds to block 308.

At block 306, signal decoding is performed. For example, a device receives a transmitted waveform comprising content and/or services, and the signal decoding logic 204 operates to decode the transmitted waveform to obtain the transmitted data 216. The method then ends at block 324.

At block 308, filter parameters are set. In an aspect, the control logic 222 operates to set parameters for the filter 218 using the filter control signal 220. For example, the filter may be a SAW filter and the filter parameters comprise a center frequency and bandwidth.

At block 310, any DC offset is removed. In an aspect, the DC offset logic 228 and 232 operates to remove any DC offset to form DC adjusted signals.

At block 312, AGC acquisition is provided. In an aspect, AGC acquisition is provided by the AGC logic of the DVGA 234 and the DVGA 238. For example, the control logic 222 operates to scale the gain control functions by providing scaling signals over the links 246 and 248. As part of the AGC process, Acc1 and Acc2 values are determined.

At block 314, a timer is started. In an aspect, the timer 244 is started and operates to measure time intervals that are used to determine when power measurements are to be made. For example, the timer 244 triggers the control logic 222 to cause a power measurement to be made.

At block 316, a test is performed to determine if the timer has timed out. In an aspect, the timer 244 signals the control logic 222 when a time out occurs. If a time out has not occurred, the method proceeds to back to block 316 to wait for a time out. If a timeout has occurred, the method proceeds to block 318.

At block 318, error values are stored. In an aspect, the error values associated with the AGC logic provided by the DVGA 234 and the DVGA 238 are stored in the log 254. For example, the control logic 222 operates to retrieve the error values and store them in the log 254.

At block, 320, a power measurement is computed. For example, the power measurement comprises a RSSI. In an aspect, stored error values are transmitted to the power detector 240 through the link 256 and a power measurement 250 is computed by the power detector 240 according to the algorithm described above.

At block 322, the measured power is stored and/or displayed. In an aspect, the measured power is display on a device display, stored in a device memory, or transmitted to another entity, such as a network server. The method then ends at block 324.

Thus, the method 300 operates to provide a power measurement system for use by a device in a communication system. It should be noted that the method 300 represents just one implementation and the changes, additions, deletions, combinations or other modifications of the method 300 are possible within the scope of the aspects.

Figure 4:
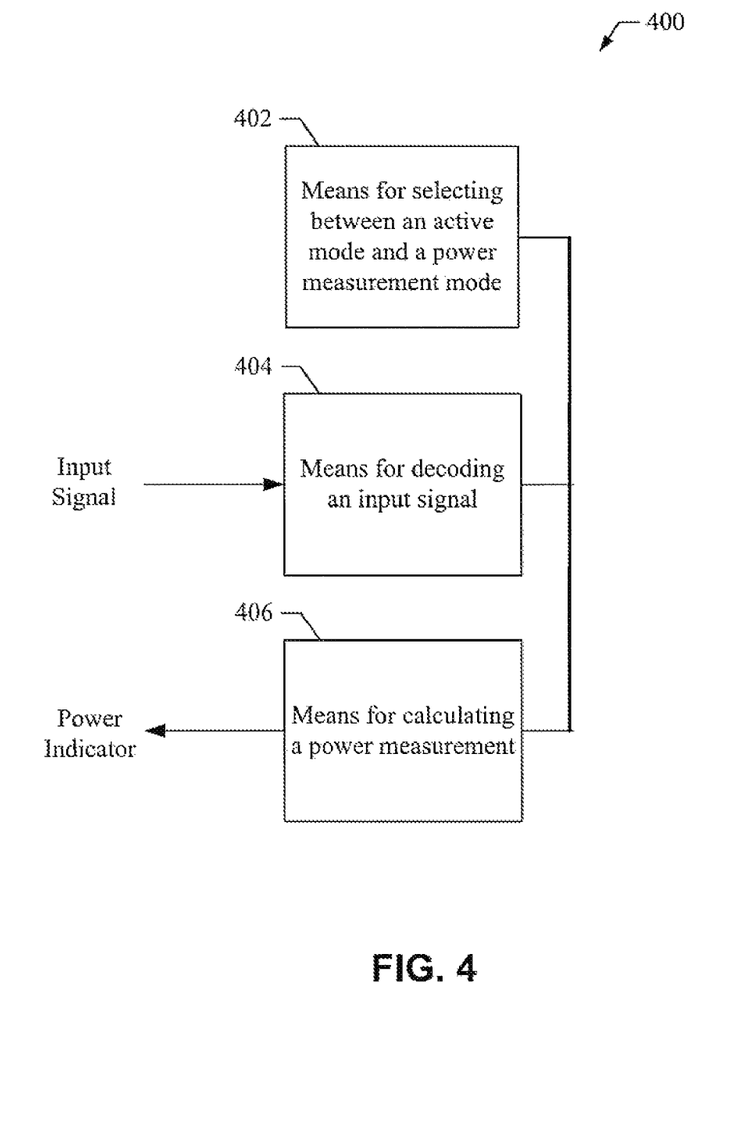
FIG. 4 shows an aspect of a power measurement system.

FIG. 4 shows an aspect of a power measurement system 400. The power measurement system 400 comprises means (402) for selecting between an active mode and a power measurement mode. For example, in an aspect, the means 402 comprises the control logic 222. The power measurement system 400 also comprises means (404) for decoding an input signal if the active mode is selected. For example, in an aspect, the means 404 comprises the receiver/demodulator 204. The power measurement system 400 also comprises means (406) for calculating a power measurement associated with the input signal if the power measurement mode is selected. For example, in an aspect, the means 406 comprises the power measurement logic 202.

In an aspect, the means 402, 404, and 406 are implemented by at least one processor configured to execute program instructions to provide aspects of a power measurement system as described herein.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a power measurement system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for power measurement for at least facilitating the identification of one of noise and interference energy in a field of a network, the method comprising:
    selecting between an active mode and a power measurement mode;
    decoding an input signal received from a transmit waveform received from the network configured to provide communications for one or more mobile devices if the active mode is selected;
    calculating a power measurement for the input signal by measuring signal energy in the time domain of the received transmit waveform if the power measurement mode is selected; and
    wherein said calculating comprises:
    filtering the input signal based on a predetermined frequency range corresponding to a predetermined channel and one or more adjacent channels to produce a filtered signal;
    removing undesired signals from the filtered signal to generate a compensated signal;
    controlling at least a portion of the gain of the compensated signal in an analog domain to produce a gain controlled signal; and
    calculating the power measurement for the predetermined channel and the one or more adjacent channels based on the gain controlled signal.

2. The method of claim 1, wherein said selecting comprises selecting between the active mode and the power measurement mode based on user input.

3. The method of claim 1, wherein said removing undesired signals further comprises:
    removing a DC component from the filtered signal to produce a DC compensated signal.

4. The method of claim 1, wherein said filtering comprises filtering the input signal using a SAW filter.

5. A method for power measurement, comprising:
    selecting between an active mode and a power measurement mode;
    decoding an input signal received from a transmit waveform if the active mode is selected;
    calculating a power measurement associated with the input signal if the power measurement mode is selected;
    wherein said selecting comprises selecting a center frequency for the power measurement; and
    wherein said calculating comprises filtering the input signal based on a frequency range derived from the selected center frequency to produce a filtered signal, and calculating a Received Signal Strength Indicator (RSSI) value based on an expression comprising:

$$RSSI = 3.01*[8192-Acc1(n)]/1024 + DVGA1SetPtTable[AGCGainState];$$

wherein $Acc1(n)$ is a loop accumulator value corresponding to an accumulation of error values associated with gain control of a first digital variable gain amplifier; and
    wherein $DVGA1SetPtTable[AGCGainState]$ is a first value for the first digital variable gain amplifier.

6. A method for power measurement, comprising:
    selecting between an active mode and a power measurement mode;
    decoding an input signal received from a transmit waveform if the active mode is selected;
    calculating a power measurement associated with the input signal if the power measurement mode is selected;
    wherein said selecting comprises selecting a center frequency for the power measurement; and wherein said calculating comprises filtering the input signal based on a frequency range derived from the selected center frequency to produce a filtered signal, and calculating a Received Signal Strength Indicator (RSSI) value based on an expression comprising:

$$RSSI=3.01*[8192-Acc1(n)-Acc2(n)]/1024+DVGA1SetPtTable[AGCGainState];$$

wherein $Acc1(n)$ is a loop accumulator value corresponding to an accumulation of error values associated with a gain control of a first digital variable gain amplifier;

wherein $Acc2(n)$ is a loop accumulator value corresponding to an accumulation of error values associated with a gain control of a second digital variable gain amplifier; and wherein DVGA1SetPtTable[AGCGainState] is a first value for the first digital variable gain amplifier.

7. The method of claim 1, further comprising performing at least one of displaying, or storing, or transmitting the power measurement.

8. The method of claim 1, further comprising performing said calculating at selected time intervals.

9. An apparatus for power measurement for at least facilitating the identification of one of noise and interference energy in a field of a network, the apparatus comprising:
control logic configured to select between an active mode and a power measurement mode;
a decoder configured to decode an input signal received from a transmit waveform received from the network configured to provide communications for one or more mobile devices if the active mode is selected;
power measurement logic configured to calculate a power measurement for the input signal by measuring signal energy in the time domain of the received transmit waveform if the power measurement mode is selected; and
wherein said power measurement logic comprises:
a filter configured to filter the input signal based on a predetermined frequency range corresponding to a predetermined channel and one or more adjacent channels to produce a filtered signal;
signal logic configured to remove undesired signals from the filtered signal to produce a compensated signal;
gain control logic configured to control at least a portion of the gain of the compensated signal in an analog domain to produce a gain controlled signal; and
power detector logic configured to calculate the power measurement for the predetermined channel and the one or more adjacent channels based on the gain controlled signal.

10. The apparatus of claim 9, wherein said control logic is configured to select between the active mode and the power measurement mode based on user input.

11. The apparatus of claim 9, wherein said signal control logic further comprises:
DC logic configured to remove a DC component from the filtered signal to produce a DC compensated signal.

12. The apparatus of claim 9, wherein said filter comprises a SAW filter.

13. An apparatus for power measurement, comprising:
control logic configured to select between an active mode and a power measurement mode;
a decoder configured to decode an input signal received from a transmit waveform if the active mode is selected;
power measurement logic configured to calculate a power measurement associated with the input signal if the power measurement mode is selected;
wherein said control logic is further configured to select a center frequency for the power measurement;
wherein said power measurement logic comprises:
a filter configured to filter the input signal based on a frequency range derived from the selected center frequency to produce a filtered signal;
DC logic configured to remove a DC component from the filtered signal to produce a DC compensated signal;
gain control logic configured to control the gain of the DC compensated signal to produce a gain controlled signal; and
power detector logic configured to calculate the power measurement based on the gain controlled signal; and
wherein said power detector logic is configured to calculate a Received Signal Strength Indicator (RSSI) value based on an expression comprising:

$$RSSI=3.01*[8192-Acc1(n)]/1024+DVGA1SetPtTable[AGCGainState];$$

wherein $Acc1(n)$ is a loop accumulator value corresponding to an accumulation of error values associated with a gain control of a first digital variable gain amplifier; and wherein DVGA1SetPtTable[AGCGainState] is a first value for the first digital variable gain amplifier.

14. An apparatus for power measurement, comprising:
control logic configured to select between an active mode and a power measurement mode;
a decoder configured to decode an input signal received from a transmit waveform if the active mode is selected;
power measurement logic configured to calculate a power measurement associated with the input signal if the power measurement mode is selected;
wherein said control logic is further configured to select a center frequency for the power measurement;
wherein said power measurement logic comprises:
a filter configured to filter the input signal based on a frequency range derived from the selected center frequency to produce a filtered signal;
DC logic configured to remove a DC component from the filtered signal to produce a DC compensated signal;
gain control logic configured to control the gain of the DC compensated signal to produce a gain controlled signal; and
power detector logic configured to calculate the power measurement based on the gain controlled signal; and
wherein said power detector logic is configured to calculate a Received Signal Strength Indicator (RSSI) value based on an expression comprising:

$$RSSI=3.01*[8192-Acc1(n)-Acc2(n)]/1024+DVGA1SetPtTable[AGCGainState];$$

wherein $Acc1(n)$ is a loop accumulator value corresponding to an accumulation of error values associated with a gain control of a first digital variable gain amplifier;

wherein $Acc2(n)$ is a loop accumulator value corresponding to an accumulation of error values associated with a gain control of a second digital variable gain amplifier; and wherein DVGA1SetPtTable[AGCGainState] is a first value for the first digital variable gain amplifier.

15. The apparatus of claim 9, wherein said power measurement logic is further configured to perform at least one of displaying, or storing, or transmitting the power measurement.

16. The apparatus of claim 9, further comprising a timer operable to cause the power measurement logic to calculate a power measurement at selected time intervals.

17. An apparatus for power measurement for at least facilitating the identification of one of noise and interference energy in a field of a network, the method comprising:
- means for selecting between an active mode and a power measurement mode;
- means for decoding an input signal received from a transmit waveform received from the network configured to provide communications for one or more mobile devices if the active mode is selected;
- means for calculating a power measurement for the input signal measuring signal energy in the time domain of the received transmit waveform if the power measurement mode is selected;
- wherein said means for calculating comprises:
- means for filtering the input signal based on a predetermined frequency range corresponding to a predetermined channel and one or more adjacent channels to produce a filtered signal;
- means for removing undesired signals from the filtered signal to generate a compensated signal;
- means for controlling at least a portion of the gain of the compensated signal in an analog domain to produce a gain controlled signal; and
- means for calculating the power measurement for the predetermined channel and the one or more adjacent channels based on the gain controlled signal.

18. The apparatus of claim 17, wherein said means for selecting comprises means for selecting between the active mode and the power measurement mode based on user input.

19. The apparatus of claim 17, wherein said means for removing undesired signals further comprises:
- means for removing a DC component from the filtered signal to produce a DC compensated signal.

20. The apparatus of claim 17, wherein said means for filtering comprises means for filtering the input signal using a SAW filter.

21. An apparatus for power measurement, comprising:
- means for selecting between an active mode and a power measurement mode;
- means for decoding an input signal received from a transmit waveform if the active mode is selected;
- means for calculating a power measurement associated with the input signal if the power measurement mode is selected;
- wherein said means for selecting comprises means for selecting a center frequency for the power measurement;
- wherein said means for calculating comprises:
- means for filtering the input signal based on a frequency range derived from the selected center frequency to produce a filtered signal;
- means for removing a DC component from the filtered signal to produce a DC compensated signal;
- means for controlling the gain of the DC compensated signal to produce a gain controlled signal; and
- means for calculating the power measurement based on the gain controlled signal; and
- wherein said means for calculating comprises means for calculating a Received Signal Strength Indicator (RSSI) value based on an expression comprising:

$$RSSI=3.01*[8192-Acc1(n)]/1024+ DVGA1SetPtTable[AGCGainState];$$

- wherein $Acc1(n)$ is a loop accumulator value corresponding to an accumulation of error values associated with a gain control of a first digital variable gain amplifier; and
- wherein DVGA1SetPtTable[AGCGainState] is a first value for the first digital variable gain amplifier.

22. An apparatus for power measurement, comprising:
- means for selecting between an active mode and a power measurement mode;
- means for decoding an input signal received from a transmit waveform if the active mode is selected;
- means for calculating a power measurement associated with the input signal if the power measurement mode is selected;
- wherein said means for selecting comprises means for selecting a center frequency for the power measurement;
- wherein said means for calculating comprises:
- means for filtering the input signal based on a frequency range derived from the selected center frequency to produce a filtered signal;
- means for removing a DC component from the filtered signal to produce a DC compensated signal;
- means for controlling the gain of the DC compensated signal to produce a gain controlled signal; and
- means for calculating the power measurement based on the gain controlled signal;
- wherein said means for calculating comprises means for calculating a Received Signal Strength Indicator (RSSI) value based on an expression comprising:

$$RSSI=3.01*[8192-Acc1(n)-Acc2(n)]/1024+ DVGA1SetPtTable[AGCGainState];$$

- wherein $Acc1(n)$ is a loop accumulator value corresponding to an accumulation of error values associated with a gain control of a first digital variable gain amplifier;
- wherein $Acc2(n)$ is a loop accumulator value corresponding to an accumulation of error values associated with a gain control of a second digital variable gain amplifier; and
- wherein DVGA1SetPtTable[AGCGainState] is a first value for the first digital variable gain amplifier.

23. The apparatus of claim 17, further comprising means for performing at least one of displaying, or storing, or transmitting the power measurement.

24. The apparatus of claim 17, further comprising means for performing said calculating at selected time intervals.

25. A non-transitory computer-readable storage medium having a computer program comprising program instructions, which when executed, operate to provide for power measurement for at least facilitating the identification of one of noise and interference energy in a field of a network, the computer program comprising:
- instructions for selecting between an active mode and a power measurement mode;
- instructions for decoding an input signal received from a transmit waveform received from the network configured to provide communications for one or more mobile devices if the active mode is selected;
- instructions for calculating a power measurement for the input signal by measuring on signal energy in the time domain of the received transmit waveform if the power measurement mode is selected;
- wherein said instructions for calculating comprise:
- instructions for filtering the input signal based on a frequency range corresponding to a predetermined channel and one or more adjacent channels to produce a filtered signal;
- instructions for removing undesired signals from the filtered signal to generate a compensated signal;

instructions for controlling at least a portion of the gain of the compensated signal in an analog domain to produce a gain controlled signal; and instructions for calculating the power measurement for the predetermined channel and the one or more adjacent channels based on the gain controlled signal.

26. The computer program of claim 25, wherein said instructions for selecting comprise instructions for selecting between the active mode and the power measurement mode based on user input.

27. The computer program of claim 25, wherein said instructions for removing undesired signals further comprise:

instructions for removing a DC component from the filtered signal to produce a DC compensated signal.

28. The computer program of claim 25, wherein said instructions for filtering comprise instructions for filtering the input signal using a SAW filter.

29. A non-transitory computer-readable storage medium having a computer program comprising program instructions, which when executed, operate to provide for power measurement, the computer program comprising:

instructions for selecting between an active mode and a power measurement mode;

instructions for decoding an input signal received from a transmit waveform if the active mode is selected;

instructions for calculating a power measurement associated with the input signal if the power measurement mode is selected;

wherein said instructions for selecting comprise instructions for selecting a center frequency for the power measurement;

wherein said instructions for calculating comprise:

instructions for filtering the input signal based on a frequency range derived from the selected center frequency to produce a filtered signal;

instructions for removing a DC component from the filtered signal to produce a DC compensated signal;

instructions for controlling the gain of the DC compensated signal to produce a gain controlled signal; and instructions for calculating the power measurement based on the gain controlled signal; and wherein said instructions for calculating comprise instructions for calculating a Received Signal Strength Indicator (RSSI) value based on an expression comprising:

$$RSSI=3.01*[8192-Acc1(n)]/1024+DVGA1SetPtTable[AGCGainState];$$

wherein $Acc1(n)$ is a loop accumulator value corresponding to an accumulation of error values associated with a gain control of a first digital variable gain amplifier; and wherein DVGA1SetPtTable[AGCGainState] is a first value for the first digital variable gain amplifier.

30. A non-transitory computer-readable storage medium having a computer program comprising program instructions, which when executed, operate to provide for power measurement, the computer program comprising:

instructions for selecting between an active mode and a power measurement mode;

instructions for decoding an input signal received from a transmit waveform if the active mode is selected;

instructions for calculating a power measurement associated with the input signal if the power measurement mode is selected;

wherein said instructions for selecting comprise instructions for selecting a center frequency for the power measurement;

wherein said instructions for calculating comprise:

instructions for filtering the input signal based on a frequency range derived from the selected center frequency to produce a filtered signal;

instructions for removing a DC component from the filtered signal to produce a DC compensated signal;

instructions for controlling the gain of the DC compensated signal to produce a gain controlled signal; and instructions for calculating the power measurement based on the gain controlled signal; and wherein said instructions for calculating comprise instructions for calculating a Received Signal Strength Indicator (RSSI) value based on an expression comprising:

$$RSSI=3.01*[8192-Acc1(n)-Acc2(n)]/1024+DVGA1SetPtTable[AGCGainState];$$

wherein $Acc1(n)$ is a loop accumulator value corresponding to an accumulation of error values associated with a gain control of a first digital variable gain amplifier;

wherein $Acc2(n)$ is a loop accumulator value corresponding to an accumulation of error values associated with a gain control of a second digital variable gain amplifier; and wherein DVGA1SetPtTable[AGCGainState] is a first value for the first digital variable gain amplifier.

31. The computer program of claim 25, further comprising instructions for performing at least one of displaying, or storing, or transmitting the power measurement.

32. The computer program of claim 25, further comprising instructions for performing said calculating at selected time intervals.

33. At least one processor configured to perform a method for power measurement for at least facilitating the identification of one of noise and interference energy in a field of a network, the method comprising:

selecting between an active mode and a power measurement mode;

decoding an input signal received from a transmit waveform received from the network configured to provide communications for one or more mobile devices if the active mode is selected;

calculating a power measurement for the input signal by measuring signal energy in the time domain of the received transmit waveform if the power measurement mode is selected;

wherein said calculating comprises:

filtering the input signal based on a predetermined frequency range corresponding to a predetermined channel and one or more adjacent channels to produce a filtered signal;

removing undesired signals from the filtered signal to generate a compensated signal;

controlling at least a portion of the gain of the compensated signal in an analog domain to produce a gain controlled signal; and calculating the power measurement for the predetermined channel and the one or more adjacent channels based on the gain controlled signal.

34. The method of claim 33, wherein said selecting comprises selecting between the active mode and the power measurement mode based on user input.

35. The method of claim 33, wherein said removing undesired signals further comprises:

removing a DC component from the filtered signal to produce a DC compensated signal.

36. The method of claim 33, wherein said filtering comprises filtering the input signal using a SAW filter.

37. At least one processor configured to perform a method for power measurement, the method comprising:
selecting between an active mode and a power measurement mode;
decoding an input signal received from a transmit waveform if the active mode is selected;
calculating a power measurement associated with the input signal if the power measurement mode is selected;
wherein said selecting comprises selecting a center frequency for the power measurement;
wherein said calculating comprises:
filtering the input signal based on a frequency range derived from the selected center frequency to produce a filtered signal;
removing a DC component from the filtered signal to produce a DC compensated signal;
controlling the gain of the DC compensated signal to produce a gain controlled signal; and
calculating the power measurement based on the gain controlled signal; and
wherein said calculating comprises calculating a Received Signal Strength Indicator (RSSI) value based on an expression comprising:

$$RSSI=3.01*[8192-Acc1(n)]/1024+DVGA1SetPtTable[AGCGainState];$$

wherein $Acc1(n)$ is a loop accumulator value corresponding to an accumulation of error values associated with a gain control of a first digital variable gain amplifier; and
wherein DVGA1SetPtTable[AGCGainState] is a first value for the first digital variable gain amplifier.

38. At least one processor configured to perform a method for power measurement, the method comprising:
selecting between an active mode and a power measurement mode;
decoding an input signal received from a transmit waveform if the active mode is selected;
calculating a power measurement associated with the input signal if the power measurement mode is selected;
wherein said selecting comprises selecting a center frequency for the power measurement;
wherein said calculating comprises:
filtering the input signal based on a frequency range derived from the selected center frequency to produce a filtered signal;
removing a DC component from the filtered signal to produce a DC compensated signal;
controlling the gain of the DC compensated signal to produce a gain controlled signal; and
calculating the power measurement based on the gain controlled signal; and
wherein said calculating comprises calculating a Received Signal Strength Indicator (RSSI) value based on an expression comprising:

$$RSSI=3.01*[8192-Acc1(n)-Acc2(n)]/1024+DVGA1SetPtTable[AGCGainState];$$

wherein $Acc1(n)$ is a loop accumulator value corresponding to an accumulation of error values associated with a gain control of a first digital variable gain amplifier;
wherein $Acc2(n)$ is a loop accumulator value corresponding to an accumulation of error values associated with a gain control of a second digital variable gain amplifier; and
wherein DVGA1SetPtTable[AGCGainState] is a first value for the first digital variable gain amplifier.

39. The method of claim 33, further comprising performing at least one of displaying, or storing, or transmitting the power measurement.

40. The method of claim 33, further comprising performing said calculating at selected time intervals.

41. A method for power measurement for at least facilitating the identification of one of noise and interference energy in a field of a network, the method comprising:
selecting between an active mode and a power measurement mode;
decoding an input signal received from a transmit waveform received from the network configured to provide communications for one or more mobile devices if the active mode is selected;
calculating a power measurement for the input signal by measuring signal energy in the time domain of the received transmit waveform if the power measurement mode is selected;
wherein said selecting comprises selecting a center frequency for the power measurement; and
wherein said calculating comprises filtering the input signal based on a frequency range derived from the selected center frequency to produce a filtered signal, calculating a Received Signal Strength Indicator (RSSI) value based at least on a first accumulation of error values associated with a first gain control of a first digital variable gain amplifier, and calculating the RSSI value based on a second accumulation of error values associated with a second gain control of a second digital variable gain amplifier.

42. The method of claim 1, wherein said selecting comprises selecting a center frequency for the power measurement, and further comprising:
filtering the input signal based on a frequency range derived from the selected center frequency to produce a filtered signal, and calculating a Received Signal Strength Indicator (RSSI) value based at least on a first accumulation of error values associated with a first gain control of a first digital variable gain amplifier;
wherein said calculating comprises calculating the RSSI value based on an expression, comprising:

$$RSSI=3.01*[8192-Acc1(n)]/1024+DVGA1SetPtTable[AGCGainState];$$

wherein $Acc1(n)$ is a loop accumulator value corresponding to the accumulation of error values associated with the gain control of the first digital variable gain amplifier; and
wherein DVGA1SetPtTable[AGCGainState] is a first value for the first digital variable gain amplifier.

43. The method of claim 1, wherein said selecting comprises selecting a center frequency for the power measurement, and further comprising:
filtering the input signal based on a frequency range derived from the selected center frequency to produce a filtered signal, and calculating a Received Signal Strength Indicator (RSSI) value based at least on a first accumulation of error values associated with a first gain control of a first digital variable gain amplifier;
wherein said calculating comprises calculating the RSSI value based on an expression, comprising:

$$RSSI=3.01*[8192-Acc1(n)-Acc2(n)]/1024+DVGA1SetPtTable[AGCGainState];$$

wherein $Acc1(n)$ is a loop accumulator value corresponding to the first accumulation of error values associated with the first gain control of the first digital variable gain amplifier;

wherein Acc2(n) is a loop accumulator value corresponding to a second accumulation of error values associated with a second gain control of a second digital variable gain amplifier; and wherein DVGA1SetPtTable[AGCGainState] is a first value for the first digital variable gain amplifier.

44. An apparatus for power measurement for at least facilitating the identification of one of noise and interference energy in a field of a network, the apparatus comprising:
control logic configured to select between an active mode and a power measurement mode;
a decoder configured to decode an input signal received from a transmit waveform received from the network configured to provide communications for one or more mobile devices if the active mode is selected;
power measurement logic configured to calculate a power measurement for the input signal by measuring signal energy in the time domain of the received transmit waveform if the power measurement mode is selected;
wherein said control logic is further configured to select a center frequency for the power measurement; and
wherein said power measurement logic comprises:
a filter configured to filter the input signal based on a frequency range derived from the selected center frequency to produce a filtered signal; and
power detector logic configured to calculate a Received Signal Strength Indicator (RSSI) value based at least on a first accumulation of error values associated with a first gain control of a first digital variable gain amplifier, and configured to calculate the RSSI value based on a second accumulation of error values associated with a second gain control of a second digital variable gain amplifier.

45. The apparatus of claim 9, wherein said control logic is further configured to select a center frequency for the power measurement, and further comprising:
a filter configured to filter the input signal based on a frequency range derived from the selected center frequency to produce a filtered signal; and
power detector logic configured to calculate a Received Signal Strength Indicator (RSSI) value based at least on a first accumulation of error values associated with a first gain control of a first digital variable gain amplifier, wherein said power detector logic is configured to calculate the RSSI value based on an expression, comprising:

$$RSSI=3.01*[8192-Acc1(n)]/1024+ DVGA1SetPtTable[AGCGainState];$$

wherein Acc1(n) is a loop accumulator value corresponding to the first accumulation of error values associated with the first gain control of the first digital variable gain amplifier; and wherein DVGA1SetPtTable[AGCGainState] is a first value for the first digital variable gain amplifier.

46. The apparatus of claim 9, wherein said control logic is further configured to select a center frequency for the power measurement, and further comprising:
a filter configured to filter the input signal based on a frequency range derived from the selected center frequency to produce a filtered signal; and
power detector logic configured to calculate a Received Signal Strength Indicator (RSSI) value based at least on a first accumulation of error values associated with a first gain control of a first digital variable gain amplifier, wherein said power detector logic is configured to calculate the RSSI value based on an expression, comprising:

$$RSSI=3.01*[8192-Acc1(n)-Acc2(n)]/1024+ DVGA1SetPtTable[AGCGainState];$$

wherein Acc1(n) is a loop accumulator value corresponding to the first accumulation of error values associated with the first gain control of the first digital variable gain amplifier;
wherein Acc2(n) is a loop accumulator value corresponding to a second accumulation of error values associated with a second gain control of a second digital variable gain amplifier; and
wherein DVGA1SetPtTable[AGCGainState] is a first value for the first digital variable gain amplifier.

47. An apparatus for power measurement for at least facilitation the identification of one of noise and interference energy in a field of a network, the apparatus comprising:
means for selecting between an active mode and a power measurement mode;
means for decoding an input signal received from a transmit waveform received from the network configured to provide communications for one or more mobile devices if the active mode is selected;
means for calculating a power measurement for the input signal by measuring signal energy in the time domain of the received transmit waveform if the power measurement mode is selected;
wherein said means for selecting comprises means for selecting a center frequency for the power measurement; and
wherein said means for calculating comprises means for filtering the input signal based on a frequency range derived from the selected center frequency to produce a filtered signal, means for calculating a Received Signal Strength Indicator (RSSI) value based at least on a first accumulation of error values associated with a first gain control of a first digital variable gain amplifier, and means for calculating the RSSI value based on a second accumulation of error values associated with a second gain control of a second digital variable gain amplifier.

48. The apparatus of claim 17, wherein said means for selecting comprises means for selecting a center frequency for the power measurement, and further comprising:
means for filtering the input signal based on a frequency range derived from the selected center frequency to produce a filtered signal, and means for calculating a Received Signal Strength Indicator (RSSI) value based at least on a first accumulation of error values associated with a first gain control of a first digital variable gain amplifier, wherein said means for calculating comprises means for calculating the RSSI value based on an expression, comprising:

$$RSSI=3.01*[8192-Acc1(n)]/1024+ DVGA1SetPtTable[AGCGainState];$$

wherein Acc1(n) is a loop accumulator value corresponding to the first accumulation of error values associated with the first gain control of the first digital variable gain amplifier; and
wherein DVGA1SetPtTable[AGCGainState] is a first value for the first digital variable gain amplifier.

49. The apparatus of claim 17, wherein said means for selecting comprises means for selecting a center frequency for the power measurement, and further comprising:
means for filtering the input signal based on a frequency range derived from the selected center frequency to produce a filtered signal, and means for calculating a Received Signal Strength Indicator (RSSI) value based at least on a first accumulation of error values associated with a first gain control of a first digital variable gain amplifier, wherein said means for calculating comprises means for calculating the RSSI value based on an expression, comprising:

$$RSSI=3.01*[8192-Acc1(n)-Acc2(n)]/1024+ DVGA1SetPtTable[AGCGainState];$$

wherein Acc1($n$) is a loop accumulator value corresponding to the first accumulation of error values associated with the first gain control of the first digital variable gain amplifier;

wherein Acc2($n$) is a loop accumulator value corresponding to a second accumulation of error values associated with a second gain control of a second digital variable gain amplifier; and wherein DVGA1SetPtTable[AGCGainState] is a first value for the first digital variable gain amplifier.

50. A non-transitory computer-readable storage medium having a computer program comprising program instructions, which when executed, operate to provide for power measurement for at least facilitating the identification of one of noise and interference energy in a field of a network, the computer program comprising:

instructions for selecting between an active mode and a power measurement mode;

instructions for decoding an input signal received from a transmit waveform received from the network configured to provide communications for one or more mobile devices if the active mode is selected;

instructions for calculating a power measurement for the input signal by measuring signal energy in the time domain of the received transmit waveform if the power measurement mode is selected;

wherein said instructions for selecting comprise instructions for selecting a center frequency for the power measurement; and wherein said instructions for calculating comprise instructions for filtering the input signal based on a frequency range derived from the selected center frequency to produce a filtered signal, instructions for calculating a Received Signal Strength Indicator (RSSI) value based at least on a first accumulation of error values associated with a first gain control of a first digital variable gain amplifier, and instructions for calculating the RSSI value based on a second accumulation of error values associated with a second gain control of a second digital variable gain amplifier.

51. The computer program of claim 25, wherein said instructions for selecting comprise instructions for selecting a center frequency for the power measurement, and further comprising instructions for filtering the input signal based on a frequency range derived from the selected center frequency to produce a filtered signal, and instructions for calculating a Received Signal Strength Indicator (RSSI) value based at least on a first accumulation of error values associated with a first gain control of a first digital variable gain amplifier, wherein said instructions for calculating comprise instructions for calculating the RSSI value based on an expression, comprising:

$$RSSI=3.01*[8192-Acc1(n)]/1024+DVGA1SetPtTable [AGCGainState];$$

wherein Acc1($n$) is a loop accumulator value corresponding to the first accumulation of error values associated with the first gain control of the first digital variable gain amplifier; and wherein DVGA1SetPtTable[AGCGainState] is a first value for the first digital variable gain amplifier.

52. The computer program of claim 25, wherein said instructions for selecting comprise instructions for selecting a center frequency for the power measurement, and further comprising instructions for filtering the input signal based on a frequency range derived from the selected center frequency to produce a filtered signal, and instructions for calculating a Received Signal Strength Indicator (RSSI) value based at least on a first accumulation of error values associated with a first gain control of a first digital variable gain amplifier, wherein said instructions for calculating comprise instructions for calculating the RSSI value based on an expression, comprising:

$$RSSI=3.01*[8192-Acc1(n)-Acc2(n)]/1024+ DVGA1SetPtTable[AGCGainState];$$

wherein Acc1($n$) is a loop accumulator value corresponding to the first accumulation of error values associated with the first gain control of the first digital variable gain amplifier;

wherein Acc2($n$) is a loop accumulator value corresponding to a second accumulation of error values associated with a second gain control of a second digital variable gain amplifier; and wherein DVGA1SetPtTable[AGCGainState] is a first value for the first digital variable gain amplifier.

53. At least one processor configured to perform a method for power measurement for at least facilitating the identification of one of noise and interference energy in a field of a network, the method comprising:

selecting between an active mode and a power measurement mode;

decoding an input signal received from a transmit waveform received from the network configured to provide communications for one or more mobile devices if the active mode is selected;

calculating a power measurement for the input signal by measuring signal energy in the time domain of the received transmit waveform if the power measurement mode is selected;

wherein said selecting comprises selecting a center frequency for the power measurement; and wherein said calculating comprises filtering the input signal based on a frequency range derived from the selected center frequency to produce a filtered signal, calculating a Received Signal Strength Indicator (RSSI) value based at least on a first accumulation of error values associated with a first gain control of a first digital variable gain amplifier, and calculating the RSSI value based on a second accumulation of error values associated with a second gain control of a second digital variable gain amplifier.

54. The method of claim 33, wherein said selecting comprises selecting a center frequency for the power measurement, and further comprising:

filtering the input signal based on a frequency range derived from the selected center frequency to produce a filtered signal, and calculating a Received Signal Strength Indicator (RSSI) value based at least on a first accumulation of error values associated with a first gain control of a first digital variable gain amplifier, wherein said calculating comprises calculating the RSSI value based on an expression, comprising:

$$RSSI=3.01*[8192-Acc1(n)]/1024+ DVGA1SetPtTable[AGCGainState];$$

wherein Acc1($n$) is a loop accumulator value corresponding to the first accumulation of error values associated with the first gain control of the first digital variable gain amplifier; and wherein DVGA1SetPtTable[AGCGainState] is a first value for the first digital variable gain amplifier.

55. The method of claim 33, wherein said selecting comprises selecting a center frequency for the power measurement, and further comprising:

filtering the input signal based on a frequency range derived from the selected center frequency to produce a filtered signal, and calculating a Received Signal Strength Indicator (RSSI) value based at least on a first accumulation of error values associated with a first gain control of a first digital variable gain amplifier, wherein said calculating comprises calculating the RSSI value based on an expression, comprising:

$$RSSI=3.01*[8192-Acc1(n)-Acc2(n)]/1024+DVGA1SetPtTable[AGCGainState];$$

wherein $Acc1(n)$ is a loop accumulator value corresponding to the first accumulation of error values associated with the first gain control of the first digital variable gain amplifier;

wherein $Acc2(n)$ is a loop accumulator value corresponding to a second accumulation of error values associated with a second gain control of a second digital variable gain amplifier; and wherein DVGA1SetPtTable[AGCGainState] is a first value for the first digital variable gain amplifier.

56. The method of claim 1, wherein said removing undesired signals further comprises performing interference cancellation on the input signal.

57. The method of claim 3, wherein said removing the DC component further comprises removing at least a portion of the DC component in the analog domain.

58. The apparatus of claim 9, wherein said signal control logic further comprises interference logic configured to perform interference cancellation on the input signal.

59. The apparatus of claim 11, wherein the DC logic is further configured to remove at least a portion of the DC component in the analog domain.

60. The apparatus of claim 17, wherein said means for removing undesired signals further comprises means for performing interference cancellation on the input signal.

61. The apparatus of claim 19, wherein said means for removing the DC component further comprises means for removing at least a portion of the DC component in the analog domain.

62. The computer program of claim 25, wherein said instructions for removing undesired signals further comprises instructions for performing interference cancellation on the input signal.

63. The computer program of claim 27, wherein said instructions for removing the DC component further comprises instructions for removing at least a portion of the DC component in the analog domain.

64. The method of claim 33, wherein said removing undesired signals further comprises performing interference cancellation on the input signal.

65. The method of claim 35, wherein said removing the DC component further comprises removing at least a portion of the DC component in the analog domain.

* * * * *